(12) United States Patent
Miyashita et al.

(10) Patent No.: US 7,872,586 B2
(45) Date of Patent: Jan. 18, 2011

(54) POWER EQUIPMENT

(75) Inventors: Makoto Miyashita, Tokyo (JP); Kazuaki Aono, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 472 days.

(21) Appl. No.: 11/896,633

(22) Filed: Sep. 4, 2007

(65) Prior Publication Data

US 2008/0061997 A1 Mar. 13, 2008

(30) Foreign Application Priority Data

Sep. 7, 2006 (JP) .............................. 2006-242310

(51) Int. Cl.
*G08B 21/00* (2006.01)
(52) U.S. Cl. ...................... 340/635; 340/647; 340/650
(58) Field of Classification Search ................ 340/635, 340/636.12, 636.13, 636.15, 636.17, 647, 340/650, 653
See application file for complete search history.

(56) References Cited

U.S. PATENT DOCUMENTS

| 5,075,629 A * | 12/1991 | Umemura et al. ........... 324/547 |
| 5,227,766 A * | 7/1993 | Endo ........................... 340/635 |
| 5,471,144 A * | 11/1995 | Meyer ......................... 324/551 |
| 5,640,154 A * | 6/1997 | Meyer et al. ........... 340/870.18 |
| 5,652,521 A * | 7/1997 | Meyer ......................... 324/551 |
| 5,859,590 A * | 1/1999 | Otani .......................... 340/635 |
| 6,111,548 A * | 8/2000 | Braunlich et al. ........... 343/789 |
| 6,661,235 B2 * | 12/2003 | Rokunohe et al. ........... 324/536 |
| 2001/0040459 A1 | 11/2001 | Kato et al. |
| 2002/0024341 A1* | 2/2002 | Rokunohe et al. ........... 324/536 |
| 2006/0132144 A1 | 6/2006 | Kato et al. |

FOREIGN PATENT DOCUMENTS

| CN | 1567665 | 1/2005 |
| CN | 1790041 | 6/2006 |
| JP | 56-134712 | 10/1981 |
| JP | 08-327686 | 12/1996 |
| JP | 2002-71743 A | 3/2002 |
| JP | 3628244 B2 | 12/2004 |

OTHER PUBLICATIONS

Office Action in CN 200710148893.4 dated Aug. 14, 2009.

* cited by examiner

*Primary Examiner*—Travis R Hunnings
(74) *Attorney, Agent, or Firm*—Buchanan Ingersoll & Rooney PC

(57) ABSTRACT

A power equipment includes a first internal abnormality detection apparatus comprising a first antenna accommodation pipe which is connected to a first connection pipe formed in a enclosed container and which accommodates a first antenna therein, and a first signal detection circuit which is connected to a first antenna and which detects an electromagnetic wave signal emitted when any abnormality has occurred within the enclosed container.

19 Claims, 9 Drawing Sheets

POWER EQUIPMENT

BACKGROUND OF THE INVENTION

1. Field of the Invention

This invention relates to a power equipment having a device which detects any abnormality occurring within the power equipment. More particularly, it relates to a power equipment including an electromagnetic wave detection device which detects a partial discharge appearing within the power equipment.

2. Description of the Background Art

A power equipment, such as an oil-filled transformer or a gas-insulated switching equipment employed in a substation or the like, in which a high voltage conductor is supported by an insulator within an enclosed container, sometimes undergoes a partial discharge due to a cause such as the mixing of foreign matter or an inferior contact. When the partial discharge is let stand, the occurrence of a serious fault is apprehended. In order to prevent such a fault from occurring, accordingly, it is necessary to detect the partial discharge phenomenon early and to take a countermeasure.

From the viewpoint of prolonging the lifetimes of existing possessed facilities, it has recently been required of the electric power industry of electric power companies etc. to furnish each of the existing possessed facilities with a partial-discharge diagnosis device which can measure the electromagnetic wave of the partial discharge at a high sensitivity in the order of 10 pC (picocoulombs), for the purpose of detecting the partial discharge within the enclosed type power equipment.

In order to cope with the requirement, an antenna installation system for electromagnetic wave detection is considered. The antenna installation system has hitherto been adopted in a novel fabricated product, and it is such that an internal electrode and an internal antenna are disposed within the enclosed equipment. In the antenna installation system, however, a dedicated electric-field relaxation shield or the like needs to be disposed around the disposed sensor, and a large-scale remodeling site work is required, so that the actual adoption of the system is often impossible on account of a high cost. On the other hand, as a simple remodeling method having heretofore been known, it is considered to adopt a method wherein a signal is detected by clamping a CT or the like to the ground line of the equipment. Since, however, a signal excited by the external electromagnetic wave of radio broadcasting, TV broadcasting or the like flows through the ground line, only a measurement precision in the order of 1,000 to 10,000 pC is attained.

Meanwhile, a method wherein the electromagnetic wave generated by the partial discharge is detected by an antenna located outside the enclosed container is a "bushing-vicinity installation antenna system" wherein the antenna is arranged on that outer surface of a bushing which corresponds to the upper end of a shield disposed on the bushing (refer to, for example, Patent Document 1 being JP-A-2002-071743).

The antenna system disclosed in Patent Document 1 has the problem that a high-frequency signal as in the case of the partial discharge within the enclosed container is greatly attenuated in propagating from within the equipment to the exterior thereof. Another problem is that, since the antenna is located in an open space, it detects electromagnetic wave noise in the space. After all, an S/N (signal-to-noise) ratio lowers, and the detection at a desired high sensitivity is impossible.

SUMMARY OF THE INVENTION

This invention has been made in order to solve the problems as mentioned above, and it has for its object to provide an apparatus which can be disposed at a low cost and with ease even in an existing power equipment such as transformer or gas-insulated equipment, and which can detect a signal emitted from a partial discharge, at a high sensitivity.

According to this invention, a power equipment wherein a high voltage conductor disposed within an enclosed container is supported by an insulator includes a first internal abnormality detection apparatus. The first internal abnormality detection apparatus includes a first antenna accommodation pipe which is connected to a first connection pipe formed in the enclosed container and which accommodates a first antenna therein, and a first signal detection circuit which is connected to the first antenna and which detects an electromagnetic wave signal emitted when any abnormality has occurred within the enclosed container.

Owing to the configuration specified above, the power equipment according to this invention can easily cope with needs for a preventive maintenance countermeasure intended to prolong the lifetime of an existing power equipment, the previous sensing of the occurrence of the abnormality, etc. Another advantage is that the electromagnetic wave signal based on the occurrence of the abnormality within the enclosed container can be detected at a high S/N ratio with the influence of a disturbance lessened.

The foregoing and other objects, features, aspects and advantages of this invention will become more apparent from the following detailed description when read in conjunction with the accompanying drawings.

DETAILED DESCRIPTION OF THE PREFERRED EMBODIMENTS OF THE INVENTION

First Embodiment

Now, a first embodiment of this invention will be described in conjunction with the drawings.

Figure 1:
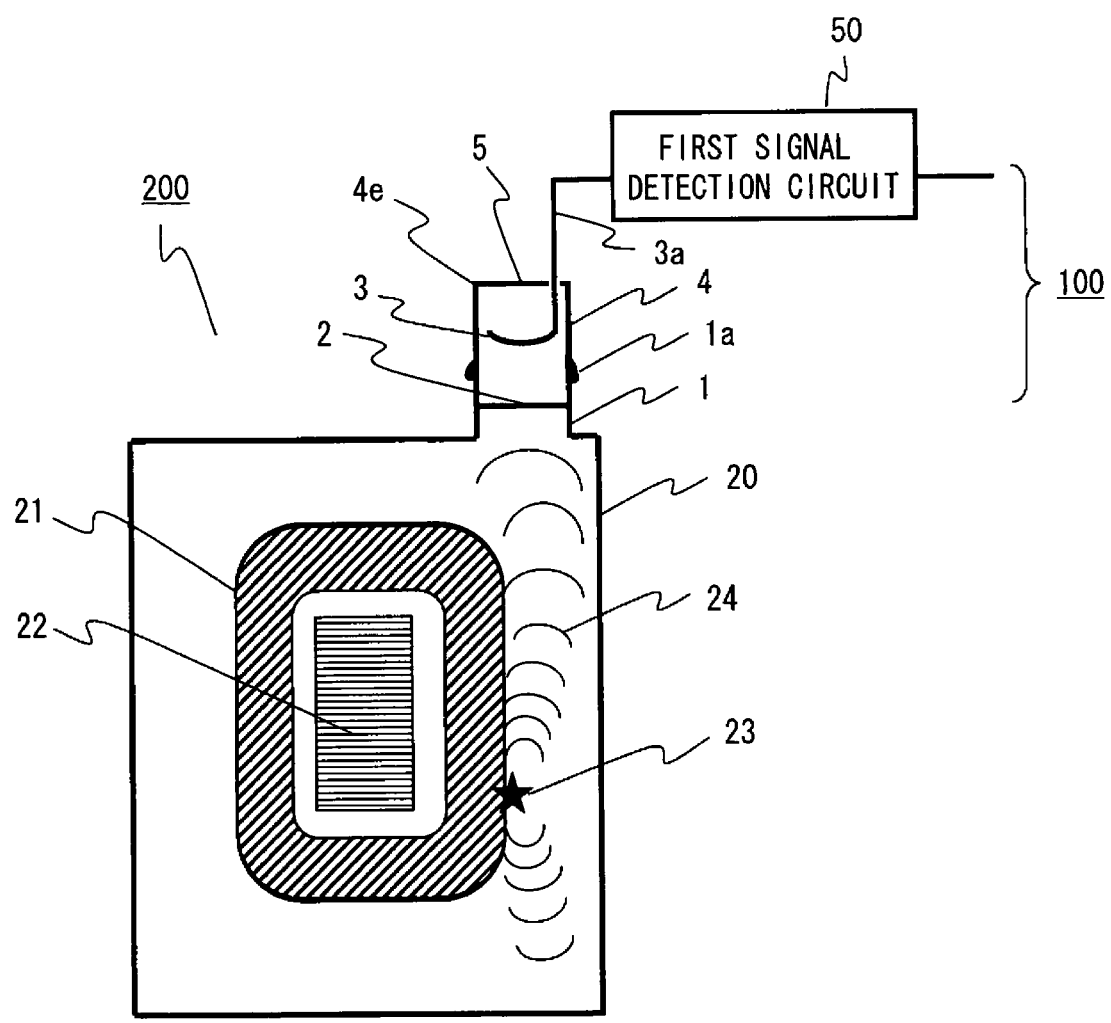
FIG. 1 is a schematic configurational diagram showing a first internal abnormality detection apparatus which is disposed in a transformer in a first embodiment of this invention.

FIG. 1 is a schematic configurational view showing a first internal abnormality detection apparatus 100 which is disposed in an oil-filled transformer 200 that is a power equipment according to the first embodiment. Incidentally, the word "first" assigned to the first internal abnormality detection apparatus 100, etc. to be stated below has been given in correspondence with a word "second" in a second embodiment of this invention to be described later.

Referring to FIG. 1, the oil-filled transformer 200 being the power equipment includes a coil 21 of high voltage conductor insulated by an insulator not shown, and an iron core 22 are disposed within an enclosed container 20. A first connection pipe 1 is disposed on the outer surface of the top part of the enclosed container 20. The first connection pipe 1 corresponds to a pressure release pipe for externally releasing that internal pressure of the enclosed container 20 which has risen due to the partial discharge of a defect 23 occurring inside the transformer 200 as the abnormal phenomenon of the transformer 200. A pressure release plate 2 made of an insulator is arranged inside the first connection pipe 1 so as not to communicate with the open air.

The first internal abnormality detection apparatus 100 is connected to the first connection pipe 1 provided with the pressure release plate 2. This first apparatus 100 includes a first antenna accommodation pipe 4 in which a first antenna 3 is accommodated, a first shield 5, a first signal detection circuit 50, and a first signal cable 3a which connects the first antenna 3 and the first signal detection circuit 50.

This embodiment illustrates a case where the existing transformer 200 is remodeled by furnishing the first connection pipe 1 of the transformer 200 with the first internal abnormality detection apparatus 100 anew. Here, the first antenna accommodation pipe 4 is unitarily connected to a distal end part 1a of the first connection pipe 1 by, for example, welding. In this case, the material of the first antenna accommodation pipe 4 should desirably be the same as the metal material of the first connection pipe 1. Besides, both the connection pipes need to have equal dimensions (equal diameters or equal rectangular dimensions). By the way, in a case where the transformer 200 is fabricated in a factory anew, the first connection pipe 1 and the first antenna accommodation pipe 4 may well be an identical pipe.

Further, within the first antenna accommodation pipe 4, the first antenna 3 is arranged opposite to the pressure release plate 2 that is the outer surface of the enclosed container 20. This first antenna 3 has the function of a detecting sensor which detects an electromagnetic wave 24 emitted from the defect 23 having appeared in the coil 21. Any of a loop antenna, a dipole antenna, a hall antenna, a spiral antenna, etc. is applicable as the first antenna 3.

The first antenna 3 is mounted so as to confront the transformer 200. The distance between the first antenna 3 and the pressure release plate 2 should preferably be as short as possible, and the first antenna 3 may well be held in close contact with the pressure release plate 2. By the way, in order to heighten a shield effect, a terminating end part 4e of the first antenna accommodation pipe 4 is concealed with the thin metal film such as an aluminum foil being the first shield 5, or a somewhat thick metal layer is mounted to the extent of not spoiling the function of the pressure release plate 2, whereby external noise is relieved.

The electromagnetic wave 24 radiated by the defect 23, for example, the partial discharge which has occurred due to any cause within the transformer 200 propagates while being reflected between the inner wall surface of the enclosed container 20 of the transformer 200 and the coil 21 or the iron core 22. Since the electromagnetic wave 24 is transmitted through the pressure release plate 2 made of the insulator, the electromagnetic wave 24 is detected by the first antenna 3 being the electromagnetic wave sensor.

Figure 2:
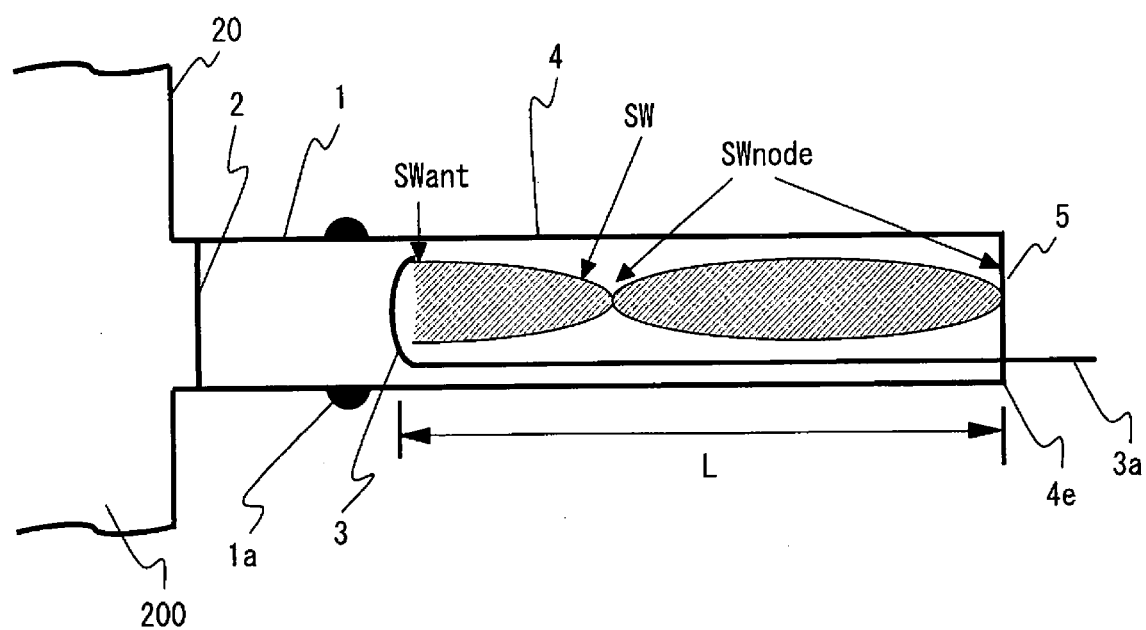
FIG. 2 is a view for explaining a standing wave in the first embodiment.

The electromagnetic wave 24 which is an internal abnormality signal detected by the first antenna 3 is transmitted to the first signal detection circuit 50 connected to the first antenna 3. Incidentally, the first shield 5 provided at the terminating end part 4e of the first antenna accommodation pipe 4 should preferably be located at a distance L at which the part of the anti-node of a standing wave agrees with the position of the first antenna 3, so as to act as the reflection plate of the electromagnetic wave 24 as shown in FIG. 2. Referring to FIG. 2, "SW" denotes the standing wave, "SWnode" denotes the node of the standing wave, "SWant" denotes the anti-node of the standing wave, and "L" denotes the distance between antenna 3 and shield 5. Owing to such a configuration, the internal abnormality signal becomes detectable at a high S/N ratio. Incidentally, the first shield 5 need not always be mounted at the terminating end part 4e, but it may well be mounted within the first antenna accommodation pipe 4.

Figure 3:
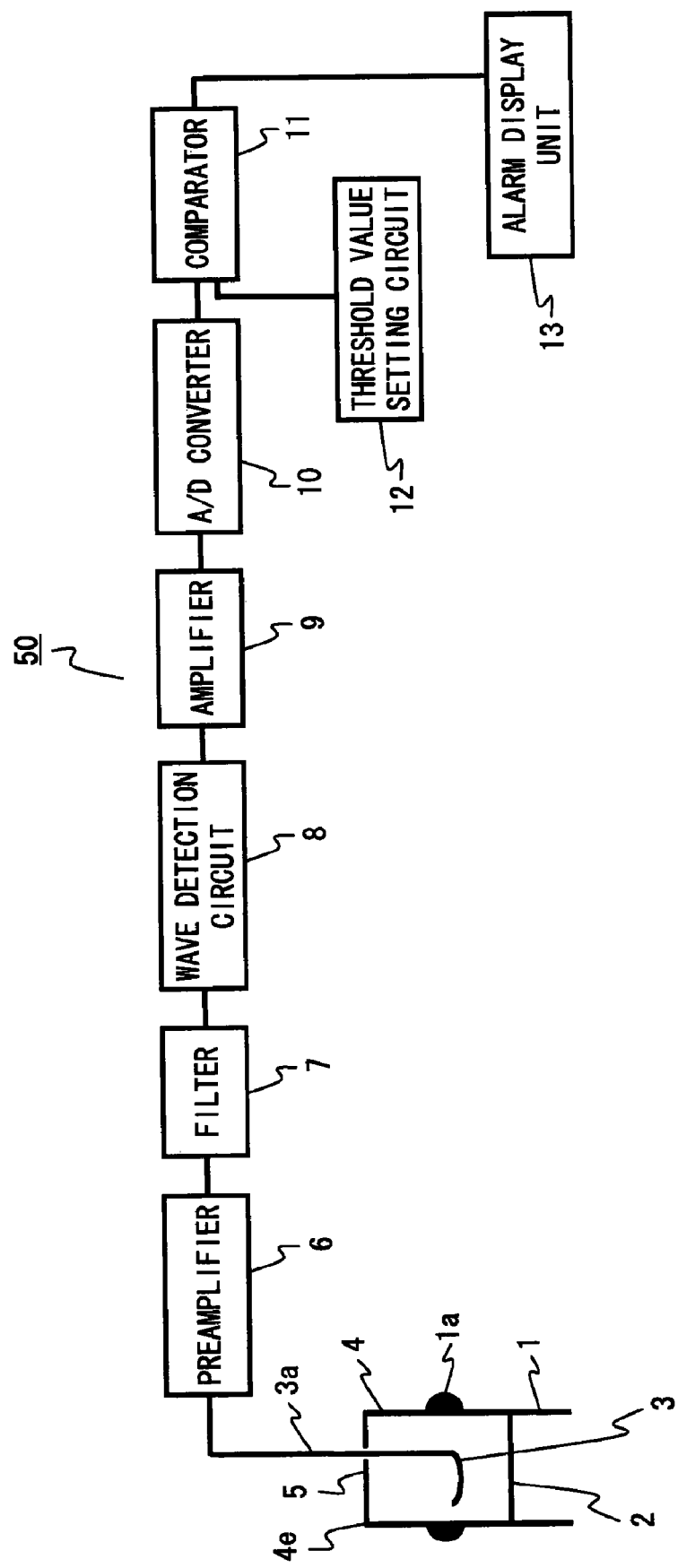
FIG. 3 is a block arrangement diagram showing a first signal detection circuit in the first embodiment of this invention.

FIG. 3 shows the block arrangement of the first signal detection circuit 50.

The first signal detection circuit 50 joined to the first antenna 3 includes a first preamplifier 6 which amplifies a detection signal, a first filter 7 which has a cutoff frequency in a desired frequency region or a frequency region before or behind the desired frequency region, a first wave detection circuit 8 which converts the frequency signal of the first filter 7 into an analog signal so as to output the analog signal, a first amplifier 9, a first A/D converter 10, a first threshold value setting circuit 12, a first comparator 11 which compares a predetermined first threshold value set in the first threshold value setting circuit 12 and the output signal of the first A/D converter 10, and a first alarm display unit 13 which receives the output signal of the first comparator 11 so as to display any abnormality.

In a case where the level of the electromagnetic wave signal generated within the enclosed container 20 as has passed through the first filter 7 exceeds the predetermined first threshold value having been previously set in the first threshold value setting circuit 12, the first comparator 11 decides the occurrence of the abnormality and provides an output so as to present the display on the first alarm display unit 13.

Next, the function of the first filter 7 will be described in detail.

Figure 4:
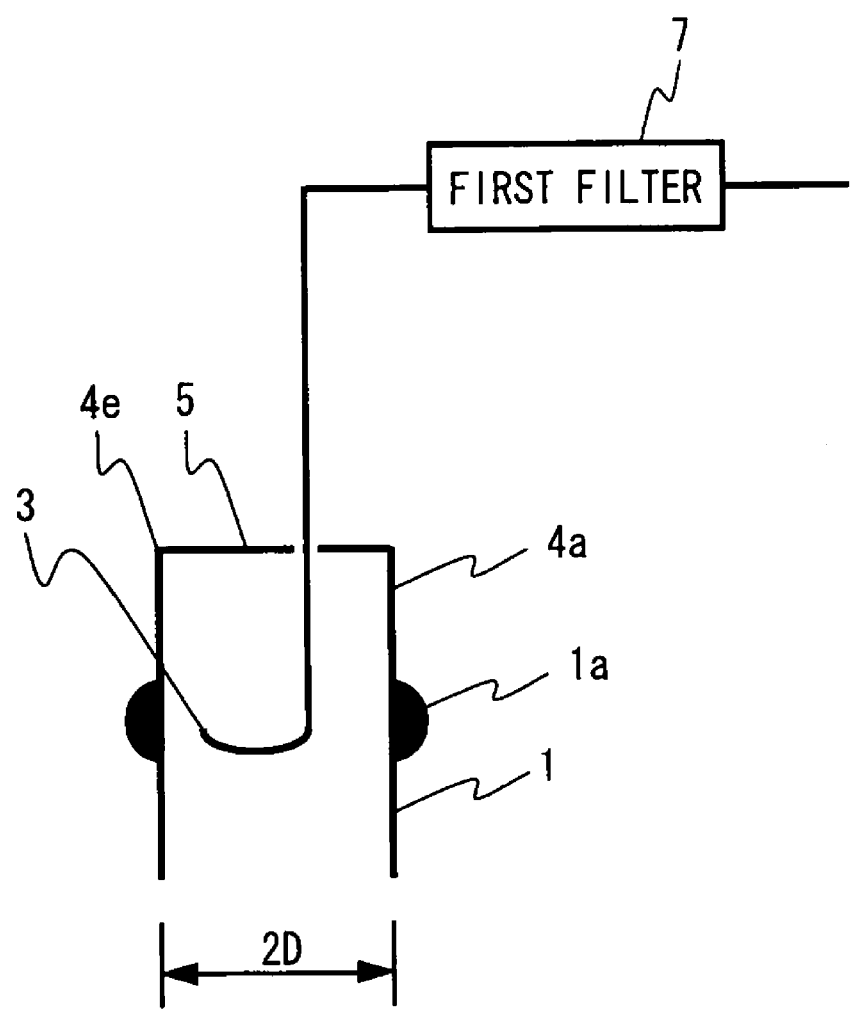
FIG. 4 is an explanatory view showing the relation between a first antenna and a first antenna accommodation pipe in the first embodiment of this invention.

FIG. 4 is an explanatory view showing the relations among the first filter 7 of the first signal detection circuit 50, an antenna accommodation pipe (waveguide) 4a and the first antenna 3. The antenna accommodation pipe 4a shown here is equivalent to the first antenna accommodation pipe 4 which is connected unitarily with the first connection pipe 1 corresponding to the pressure release pipe. The signal detected by the first antenna 3 is connected to the first filter 7. The electromagnetic wave signal which has propagated from within the transformer 200 being the power equipment, passes through the antenna accommodation pipe 4a. In this case, assuming that the cross section of the antenna accommodation pipe 4a is circular and that the diameter thereof is "2D", this antenna accommodation pipe 4a acts as the waveguide. In addition, the electromagnetic wave to pass through the antenna accommodation pipe 4a being the waveguide can pass only at frequencies higher than a certain frequency, on account of the cutoff frequency. It is also known that, since the electromagnetic wave propagates as a TE wave or a TM wave, it resonates in a certain predetermined frequency band.

Here, the "TE wave" is short for "Transverse Electric wave", the magnetic field of which is in the traveling direction of the wave and the electric field of which becomes perpendicular to the traveling direction. Besides, the "TM wave" is short for "Transverse Magnetic wave", the electric field of which is in the traveling direction of the wave and the magnetic field of which becomes perpendicular to the traveling direction.

In general, the "TE wave" which propagates in the circular waveguide is expressed in the shape of "Temn" by two modes m and n formed within the waveguide. Here, the antenna accommodation pipe 4a shown in FIG. 4 is regarded as the circular waveguide, and the diameter thereof is assumed to be 2D. The frequency "fte" of the TE mode can be expressed as fte=V/$\lambda$te where "V" denotes the propagation velocity of the electromagnetic wave.

In simplified fashion, the $TE_{01}$ mode of the circular waveguide is evaluated as $\lambda$te=1.64×D. Likewise, the $TE_{11}$ mode is evaluated as $\lambda$te=3.41×D in simplified fashion. In this case, the frequency of the $TE_{11}$ mode becomes the cutoff frequency, and frequencies lower than the cutoff frequency cannot pass.

As in the above, a TMmn mode exists in the circular waveguide. The frequency "ftm" of the TM mode can be expressed as ftm=V$\lambda$tm. Approximately, $TM_{01}$ mode can be expressed as $\lambda$tm=2.61×D, and the $TM_{11}$ mode can be expressed as $\lambda$tm=1.64×D.

Accordingly, when the tuning frequency of the first filter 7 is set at any of the frequency bands evaluated above, in consideration of the detection frequency bands of the first antenna 3 and the first amplifier 9, the electromagnetic wave signal which is based on the partial discharge generated from within the power equipment can be measured at a good sensitivity and in separation from the noise.

The pressure release pipes with which the power equipments are provided, have various diameters. However, assuming that the diameter of the pressure release pipe in the case of the transformer is about 10 cm or greater, the pass frequency bandwidth of the first filter 7 may be set in a range of at most 5 GHz. In this manner, the magnetic wave signal is measured through the filter which tunes the resonance frequency of the power equipment determined by the dimensions and shape thereof and the detected electromagnetic wave, so that the precision of discrimination from the external noise arriving from outside the power equipment can be heightened. The resonance frequency of the power equipment is a frequency structurally determined, and general noise does not have any specified frequency band and is therefore discriminable.

In the case where the antenna accommodation pipe 4a in which the first connection pipe 1 and the first antenna accommodation pipe 4 connected to the first connection pipe 1 are made unitary is regarded as the waveguide as described above, the frequencies below the certain frequency cannot pass, and hence, the sensitivity is enhanced more by positively cutting the frequencies by the first filter 7.

In a case where the cross-sectional shapes of the first connection pipe 1 and the first antenna accommodation pipe 4 connected thereto are oblong, the antenna accommodation pipe 4a may be regarded as a rectangular waveguide. Here, letting "a" and "b" (a>b) denote the heightwise and widthwise sides of each cross section, respectively, by way of example, the $TE_{01}$ mode is approximately expressed as $\lambda$te=2×a, and the $TE_{11}$ mode is approximately expressed as $\lambda$te=2×a/$\sqrt{(1+(a/b)^2)}$.

A $TM_{21}$ mode is expressed as $\lambda$tm=2×a$\sqrt{(1+(a/2b)^2)}$ Thus, the TE mode frequency "fte" and the TM mode frequency "ftm" can be obtained by substituting the evaluated "$\lambda$te" and "$\lambda$tm" into the formulas mentioned before, respectively.

In the above description, the tuning frequency of the first filter 7 has been set at the frequency which resonates within the antenna accommodation pipe 4a having the function of the waveguide. In the case of the transformer 200, the cross section of the enclosed container 20 is oblong structurally, and the enclosed container 20 can be regarded as the rectangular waveguide. Accordingly, the frequencies of the TE mode and TM mode of the transformer 200 can be computed in conformity with the formulas mentioned before. When the frequencies are evaluated in more detail, part of the internal structure of the transformer, for example, the clearance between the coil 21 and the enclosed container 20 can be regarded as a rectangular waveguide.

Next, there will be described a case where the resonance frequency of the transformer 200 is evaluated by an actual measurement.

Figure 5:
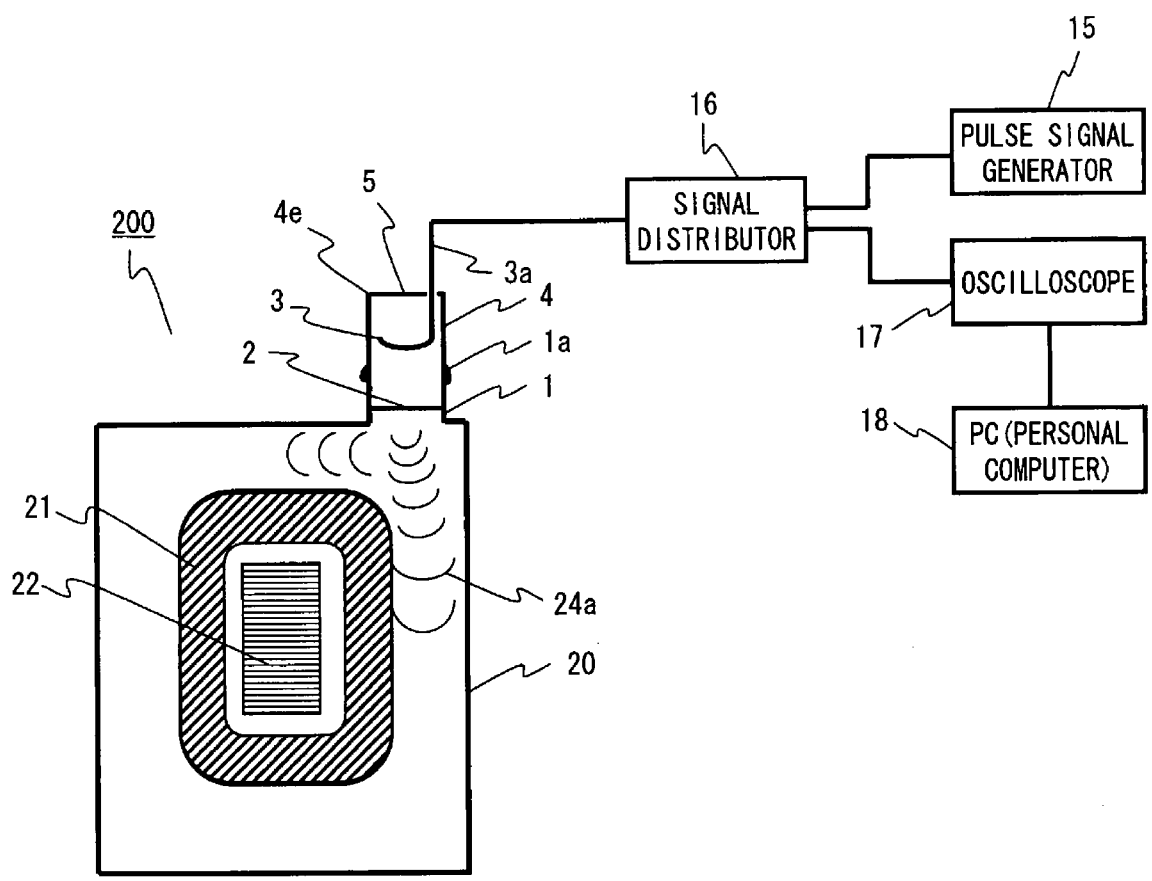
FIG. 5 is an explanatory view in the case where the resonance frequency of the transformer in the first embodiment of this invention is evaluated by an actual measurement.
Figure 6:
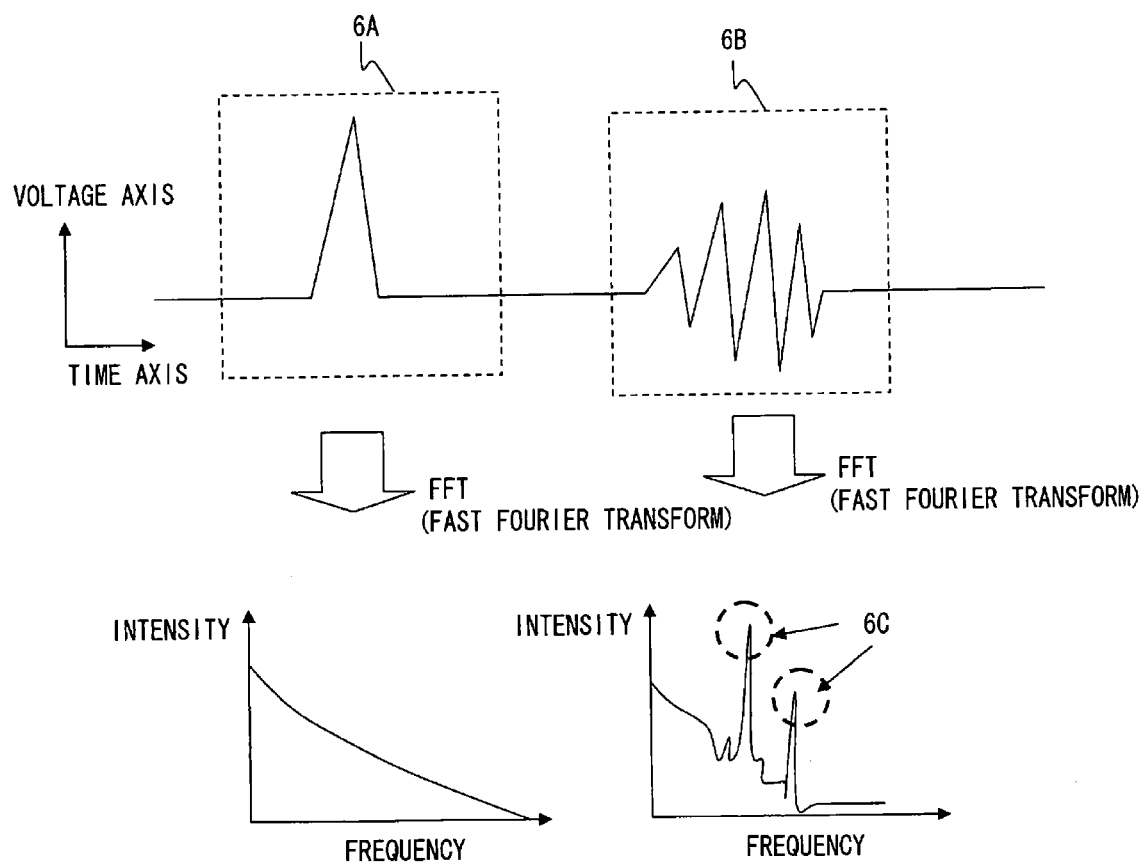
FIG. 6 is a diagram showing the oscilloscope waveforms of an actual measurement example of the resonance frequency of the transformer in the first embodiment of this invention.

Referring to FIG. 5, an electromagnetic wave pulse containing a high frequency component is oscillated from a pulse signal generator 15, and the electromagnetic wave pulse is inputted to an oscilloscope 17 and the first antenna 3 for electromagnetic wave detection, through a signal distributor 16. Since the first antenna 3 is sensitive to frequencies of wide band, the high frequency pulse is oscillated from the first antenna 3 toward the interior of the transformer 200 in the form of an electromagnetic wave pulse 24a. In propagating within the transformer 200, the electromagnetic wave pulse 24a is resonated by the structure of the transformer 200. The first antenna 3 receives a reflected wave from the transformer 200 after the pulse oscillation, and the received signal is inputted to the oscilloscope 17 through the signal distributor 16. The pulses are observed as shown in the upper stage of FIG. 6, on the screen of the oscilloscope 17. In the upper stage of FIG. 6, the axis of ordinates represents a voltage axis, while the axis of abscissas represents a time axis. Further, sign 6A denotes the oscillated pulse, and sign 6B the received pulse. Since the received pulse propagates through a signal line and within the equipment, it is observed later than the oscillated pulse. Here, the data of the oscilloscope 17 are accepted into a personal computer (PC) 18. In addition, both the pulses are separated and are respectively subjected to FFTs (fast Fourier transforms) on the PC 18 as shown in the lower stage of FIG. 6, and resonant parts are investigated by comparing the frequency analysis results of the oscillated pulse and received pulse, whereby the resonance frequencies of the equipment (as shown at 6C in the lower stage of FIG. 6) can be found out. In the lower stage of FIG. 6, the axis of ordinates represents a intensity axis, while the axis of abscissas represents a frequency axis. Further, sign 6C denotes the resonance frequency.

The first embodiment is chiefly directed to the transformer of the existing power equipment, and it has been described in relation to the case where the first connection pipe 1 corresponding to the pressure release pipe disposed for the transformer is furnished with the first antenna accommodation pipe 4 and the first signal detection circuit 50 anew. However, the connection pipe of the existing product is not always restrictive, but the structure in which the first connection pipe 1 and the first antenna accommodation pipe 4 are configured of the single pipe may well be adopted in fabricating the new product in the factory, without providing the first connection pipe 1 and the first antenna accommodation pipe 4 separately from each other.

In this manner, according to the first embodiment, the apparatus which detects the occurrence of the internal abnormality such as the partial discharge of the existing power equipment is realized by the simple operations, in a short term and at a low cost, without performing any special large-scale work and without especially renovating the structure of the power equipment. Moreover, when the first embodiment is compared with the externally-mounted antenna system in the prior art, the antenna accommodation pipe fulfills the shield function against the external noise, so that the signal can be detected at an enhanced S/N ratio.

Second Embodiment

The first embodiment has been described as to the case of disposing the first internal abnormality detection apparatus 100 which is configured by unitarily connecting the first antenna accommodation pipe 4 to the first connection pipe 1 that corresponds to the pressure release pipe of the transformer 200 being the power equipment.

Figure 7:
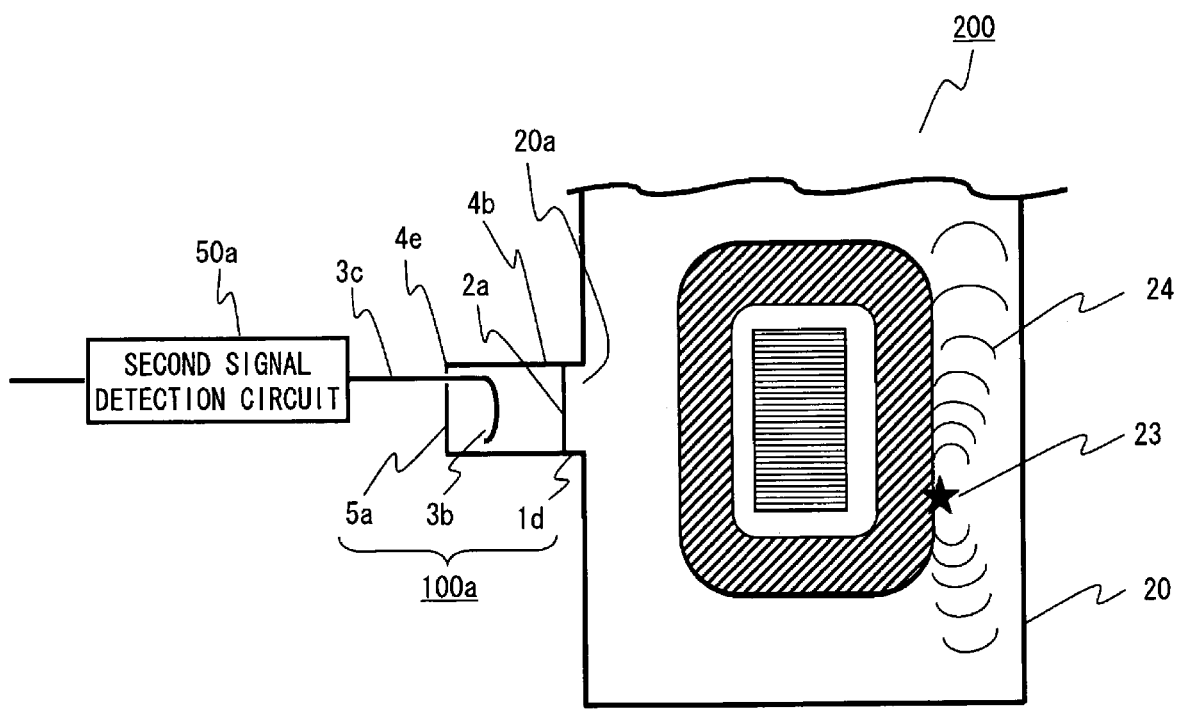
FIG. 7 is a diagram showing a second internal abnormality detection apparatus which is disposed in a transformer in a second embodiment of this invention.

In the second embodiment of this invention, as shown in FIG. 7, in addition to the first embodiment, a second internal abnormality detection apparatus 100a which is configured having the same structure, the same shape, the same inside rectangular dimensions, the same length and the same material as those of the first internal abnormality detection apparatus 100 illustrated in the first embodiment (however, the function of only the pressure release plate is partly different) is disposed on the other outer surface of the enclosed container 20 remote from the first connection pipe 1 of the transformer 200.

In FIG. 7, the first internal abnormality detection apparatus 100 which is connected to the first connection pipe 1 of the enclosed container 20 shown in FIG. 1 in the first embodiment is omitted from illustration. In addition, a second antenna accommodation pipe 4b which constitutes the second internal abnormality detection apparatus 100a according to the second embodiment is mounted by welding or the like on the lateral outer surface of the enclosed container 20 of the transformer 200 as lies at a predetermined distance from the first internal abnormality detection apparatus 100 of the first embodiment. More specifically, in this second embodiment, the enclosed container 20 is provided with a second connection pipe 1d, and the second antenna accommodation pipe 4b is connected to the second connection pipe 1d. Besides, a partition plate 2a made of an insulator, which transmits an electromagnetic wave signal and which partitions the open air and the interior of the enclosed container 20, is arranged in the second connection pipe 1d. The mounting position of a second antenna 3b within the second antenna accommodation pipe 4b is the position indicated in the first embodiment, that is, the distance of the mounting position from the outer surface of the enclosed container 20 is the same as in the first embodiment.

The predetermined distance between the first antenna accommodation pipe 4 and the second antenna accommodation pipe 4b needs to be at least the quarter wavelength of a detection frequency because of the necessity for a resolution at which the difference of the arrival times of signals based on the first antenna 3 and the second antenna 3b can be read. By way of example, a distance of about 5 to 15 meters is suitable. Incidentally, the second antenna accommodation pipe 4b of the second internal abnormality detection apparatus 100a according to the second embodiment is mounted by providing a penetrating hole 20a in the enclosed container 20, but the second antenna accommodation pipe 4b need not have the function of releasing the internal pressure of the enclosed container 20 at the occurrence of the abnormality of the transformer 200.

Accordingly, the partition plate 2a made of the insulator, which is arranged in the second antenna accommodation pipe 4b and which partitions the interior of the transformer 200 and the open air, may have a strength corresponding to the arrangement position thereof. Incidentally, an epoxy resin or the like is employed as the material of the partition plate 2a. Also, a second signal detection circuit 50a in the second embodiment has the same configuration as that of the first signal detection circuit 50 in the first embodiment stated before, and its constituents may have a word "second" affixed thereto instead of the word "first".

In this manner, in the second embodiment, the enclosed container 20 is furnished, not only with the first internal abnormality detection apparatus 100 based on the configurations of the first connection pipe 1 and the first antenna accommodation pipe 4 according to the first embodiment, but also with the second internal abnormality detection apparatus 100a. And the second internal abnormality detection apparatus 100a includes the second antenna accommodation pipe 4b which has the same shape, the same inside rectangular dimensions, the same length, the same antenna-mounting position and the same material as those of the first antenna accommodation pipe 4, and the second signal detection circuit 50a which is joined to the second antenna 3b. It is therefore permitted to detect the signals from the plurality of places through the plurality of sensors (antennas). In this regard, the first internal abnormality detection apparatus 100 presents the alarm display of abnormality detection in accordance with the electromagnetic wave signal based on the first threshold value, and the second internal abnormality detection apparatus 100a presents an alarm display of abnormality detection in accordance with an electromagnetic wave signal based on a second threshold value. As a result, the first and second threshold values can be selected depending upon the internal configuration of the power equipment and the mounting positions of the first and second internal abnormality detection apparatuses 100 and 100a. The first and second internal abnormality detection apparatuses 100 and 100a having such first and second threshold values are disposed, whereby the AND condition between the first and second threshold values can be adopted. Accordingly, a detection precision is enhanced, and the reliability of the abnormality detection is also enhanced. A further advantage is that the position of an abnormality occurrence place is specified more easily.

Incidentally, the second antenna accommodation pipe 4b according to the second embodiment may be disposed on the existing power equipment by a remodeling site work, or it may well be disposed on a new product at the fabrication thereof in a factory. Further, it is also allowed to adopt a structure in which the second connection pipe 1d and the second antenna accommodation pipe 4b are configured of a single pipe without providing them separately from each other.

Third Embodiment

Figure 8:
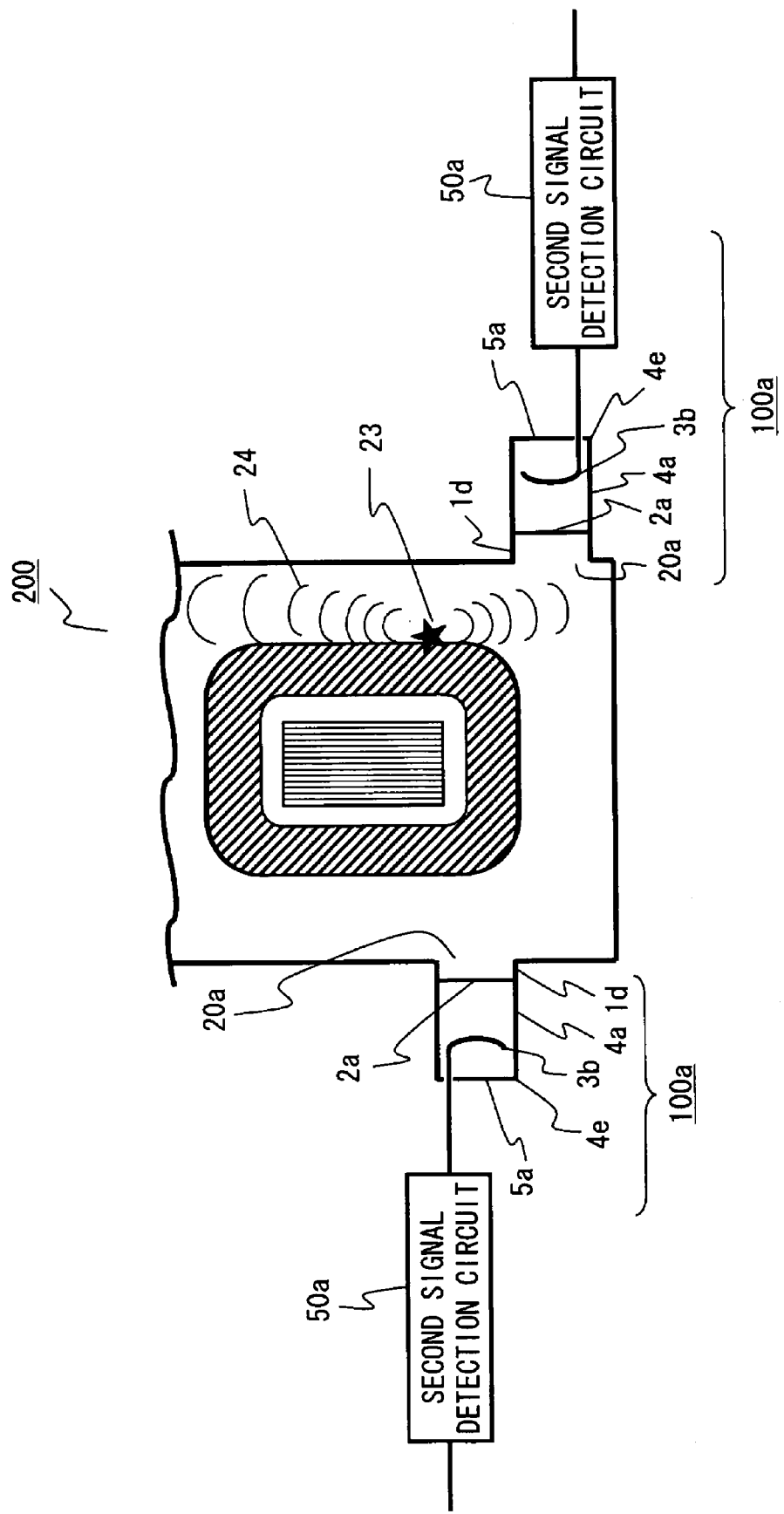
FIG. 8 is a diagram showing second internal abnormality detection apparatuses which are disposed in a transformer in a third embodiment of this invention.

The third embodiment of this invention illustrates an example in which, as shown in FIG. 8, two second internal abnormality detection apparatuses 100a in the second embodiment stated before are separately disposed on the outer surfaces of the enclosed container 20 of the transformer 200. In this case, the power equipment includes the first internal abnormality detection apparatus 100 having the configurations of the first connection pipe 1 and the first antenna accommodation pipe 4 according to the first embodiment stated before, and besides, the two second internal abnormality detection apparatuses 100a shown in FIG. 8, totaling three internal abnormality detection apparatuses.

The transformer 200 may well include only the two internal abnormality detection apparatuses 100a in the third embodiment as shown in FIG. 8, without disposing the first internal abnormality detection apparatus 100 in the first embodiment stated before (that is, with the mere pressure release pipe function left behind). Besides, the number of the internal abnormality detection apparatuses 100a is not limited to two, but it may well be three or more.

When applied to the remodeling work of the existing power equipment, such a configuration of the third embodiment has the large number of merits of easy operations, the short term of the work, a low cost, etc.

Fourth Embodiment

Figure 9:
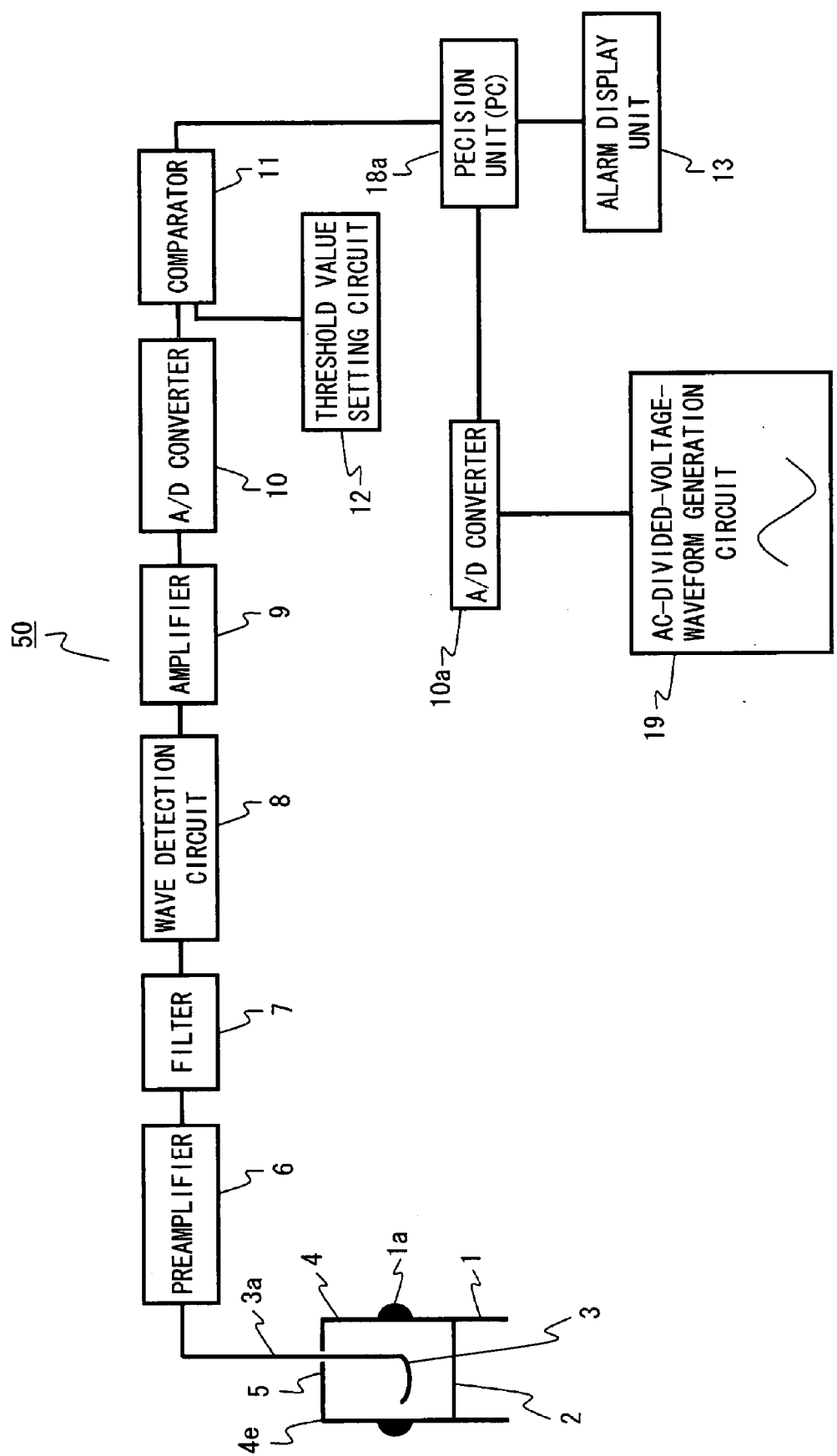
FIG. 9 is a block arrangement diagram showing a signal detection circuit in a fourth embodiment of this invention.

The first signal detection circuit 50 in the first embodiment stated before has had the configuration shown in FIG. 3. As shown in FIG. 9, a signal detection circuit 50 in the fourth embodiment of this invention includes a PC (personal computer) 18a which is a decision unit connected to a comparator 11, an A/D converter 10a which is connected to the PC 18a, and an AC-divided-voltage-waveform generation circuit 19 which is connected to the A/D converter 10a.

In the configuration, when an electromagnetic wave signal has exceeded a noise level in the comparator 11, it is transmitted to the PC 18a so as to execute decision processing within this PC 18a. In the PC 18a, the electromagnetic wave signal and an AC waveform outputted from the AC-divided-voltage-waveform generation circuit 19 are combined, and if the electromagnetic wave signal is synchronous to the AC divided voltage waveform is decided. When the electromagnetic wave signal is synchronous, the occurrence of a partial discharge is judged, and the PC 18a delivers an output to an alarm display unit 13.

Owing to the adoption of such a configuration of the fourth embodiment, the signal detection circuit 50 has a higher S/N ratio with respect to the partial discharge which occurs within a transformer 200. Incidentally, this fourth embodiment may be applied to any of the first to third embodiments.

Incidentally, each of the first to fourth embodiments of this invention has mentioned the oil-filled transformer as the example of the power equipment. However, this invention is not restricted to the example, but it is also applicable to a high voltage power equipment having an enclosed container (tank), such as gas-insulated equipment.

This invention can be utilized for the power equipment such as an oil-filled transformer and a gas-insulated switch in which a high voltage conductor is disposed within an enclosed container (tank).

Various modifications and alterations of this invention will be apparent to those skilled in the art without departing from the scope and spirit of this invention, and it should be understood that this invention is not limited to the illustrative embodiments set forth herein.

What is claimed is:

1. A power equipment wherein a high voltage conductor disposed within an enclosed container is supported by an insulator, comprising:

a first internal abnormality detection apparatus including a first antenna accommodation pipe which is connected to a first connection pipe formed in the enclosed container and which accommodates a first antenna therein, and a first signal detection circuit which is connected to the first antenna and which detects an electromagnetic wave signal emitted when any abnormality has occurred within the enclosed container, the first signal detection circuit including a first filter which is tuned to a resonance frequency band of the first antenna accommodation pipe.

2. A power equipment as defined in claim 1, wherein a first shield for intercepting external noise is arranged in the first antenna accommodation pipe.

3. A power equipment as defined in claim 2, wherein the first shield is disposed so as to conceal a terminal end part of the first antenna accommodation pipe.

4. A power equipment wherein a high voltage conductor disposed within an enclosed container is supported by an insulator, comprising:

a first internal abnormality detection apparatus including a first antenna accommodation pipe which is connected to a first connection pipe formed in the enclosed container and which accommodates a first antenna therein, and a first signal detection circuit which is connected to the first antenna and which detects an electromagnetic wave signal emitted when any abnormality has occurred within the enclosed container; and a pressure release plate made of an insulator being disposed in the first connection pipe in order to externally release an internal pressure which rises with the occurrence of the abnormality within the enclosed container.

5. A power equipment as defined in claim 1, wherein the first signal detection circuit further includes;

a first comparator which compares a level of the electromagnetic wave signal with a first threshold value, and a first alarm display unit which presents an alarm display in a case where the first comparator has judged that the signal level of the electromagnetic wave signal through the first filter has exceeded the first threshold value.

6. A power equipment as defined in claim 5, the first signal detection circuit thereof further including;

a first AC-divided-voltage-waveform generation circuit which outputs a first AC-divided-voltage waveform, a first decision unit to which a signal of the first comparator and the first AC-divided-voltage waveform are inputted in the case where the first comparator has judged that the signal level of the electromagnetic wave signal through the first filter has exceeded the first threshold value, and which detects synchronism between the electromagnetic wave signal and the first AC-divided-voltage wave form so as to judge the abnormality as a partial discharge when the synchronism has been detected, and wherein the alarm display is presented by the first alarm display unit when the synchronism has been detected.

7. A power equipment as defined in claim 1, wherein the first connection pipe is formed on an outer surface of the enclosed container.

8. A power equipment as defined in claim 1, wherein the first connection pipe and the first antenna accommodation pipe are configured of a single pipe.

9. A power equipment wherein a high voltage conductor disposed within an enclosed container is supported by an insulator, comprising:

a first internal abnormality detection apparatus including a first antenna accommodation pipe which is connected to a first connection pipe formed in the enclosed container and which accommodates a first antenna therein, and a first signal detection circuit which is connected to the first antenna and which detects an electromagnetic wave signal emitted when any abnormality has occurred within the enclosed container;

a second connection pipe formed on the enclosed container, a partition plate made of an insulator, which transmits the electromagnetic wave signal and which partitions the open air and the interior of the enclosed container, the partition plate being disposed within the second connection pipe; and a second internal abnormality detection apparatus including a second antenna accommodation pipe which is connected to the second connection pipe and which accommodates a second antenna therein, and a second signal detection circuit which is connected to the second antenna and which detects the electromagnetic wave signal.

10. A power equipment as defined in claim 9, wherein a second shield for intercepting external noise is arranged in the second antenna accommodation pipe.

11. A power equipment as defined in claim 10, wherein the second shield is disposed so as to conceal a terminal end part of the second antenna accommodation pipe.

12. A power equipment as defined in claim 9, wherein the second signal detection circuit includes;
a second filter which is tuned to a resonance frequency band of the second antenna accommodation pipe,
a second comparator which compares a level of the electromagnetic wave signal with a second threshold value, and
a second alarm display unit which presents an alarm display in a case where the second comparator has judged that the signal level of the electromagnetic wave signal through the second filter has exceeded the second threshold value.

13. A power equipment as defined in claim 12, the second signal detection circuit thereof further including;
a second AC-divided-voltage-waveform generation circuit which outputs a second AC-divided-voltage waveform,
a second decision unit to which a signal of the second comparator and the second AC-divided-voltage waveform are inputted in the case where the second comparator has judged that the signal level of the electromagnetic wave signal through the second filter has exceeded the second threshold value, and which detects synchronism between the electromagnetic wave signal and the second AC-divided-voltage waveform so as to judge the abnormality as a partial discharge when the synchronism has been detected, and wherein the alarm display is presented by the second alarm display unit when the synchronism has been detected.

14. A power equipment as defined in claim 9, wherein the first antenna accommodation pipe connected to the first connection pipe and the second antenna accommodation pipe connected to the second connection pipe are arranged at a predetermined distance.

15. A power equipment as defined in claim 9, wherein the second connection pipe is formed on an outer surface of the enclosed container.

16. A power equipment as defined in claim 9, wherein the second connection pipe and the second antenna accommodation pipe are configured of a single pipe, and a partition plate made of an insulator, transmitting the electromagnetic wave signal and partitioning the open air and the interior of the enclosed container, is disposed within the second antenna accommodation pipe and on a side of the enclosed container with respect to the second antenna.

17. A power equipment as defined in claim 9, wherein a plurality of such second internal abnormality detection apparatuses are disposed, and the first and second internal abnormality detection apparatuses are arranged at predetermined distances from one another.

18. A power equipment having a first connection pipe, and a pressure release plate made of an insulator, which is disposed within the first connection pipe in order to externally release a pressure that rises with occurrence of any abnormality within an enclosed container, wherein a high voltage conductor disposed within the enclosed container is supported by an insulator, comprising:
an antenna accommodation pipe in which an antenna is arranged,
a second connection pipe which connects the antenna accommodation pipe and the enclosed container,
a second signal detection device which is connected to the antenna and which detects a signal emitted when the abnormality has occurred within the enclosed container, and
a partition plate made of an insulator, which transmits the signal at the occurrence of the abnormality within the enclosed container and which is disposed within the second connection pipe in order to partition the open air and the interior of the enclosed container.

19. A power equipment as defined in claim 18, wherein the antenna accommodation pipe and the second connection pipe are configured of a single pipe.

* * * * *